US006285534B1

(12) United States Patent
Gibson et al.

(10) Patent No.: US 6,285,534 B1
(45) Date of Patent: Sep. 4, 2001

(54) CIRCUIT BREAKER WITH COMMON TEST BUTTON FOR SEPARATE TESTING OF GROUND FAULT AND ACR FAULT FUNCTION

(75) Inventors: Jeffrey Scott Gibson, Aliquippa; Michael Jerome Whipple, Rochester, both of PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/490,566

(22) Filed: Jan. 25, 2000

(51) Int. Cl.[7] .......... H02H 9/08
(52) U.S. Cl. .......... 361/42
(58) Field of Search .......... 361/42, 43, 48, 361/79, 115

(56) References Cited

U.S. PATENT DOCUMENTS

| | | |
|---|---|---|
| 4,686,600 | 8/1987 | Morris et al. . |
| 4,823,225 | 4/1989 | Foster et al. . |
| 4,851,951 | 7/1989 | Foster, Jr. . |
| 5,260,676 | 11/1993 | Patel et al. . |
| 5,293,522 | 3/1994 | Fello et al. . |
| 5,546,266 | 8/1996 | Mackenzie et al. . |

*Primary Examiner*—Edward H. Tso
(74) *Attorney, Agent, or Firm*—Martin J. Moran

(57) ABSTRACT

A miniature circuit breaker providing arc fault protection and ground fault protection has a common rocker button that selectively deflects orthogonally oriented flat electrically conductive test switch spring contacts of an arc fault test circuit and a ground fault test circuit into engagement with a common contact to test each of these protection functions independently. The pivot axis of the rocker button is parallel to the planes of each of the test switch spring contacts and the button has opposed fingers which preload both of the spring contacts to bias the rocker button to a neutral position.

10 Claims, 4 Drawing Sheets

FIG. 4
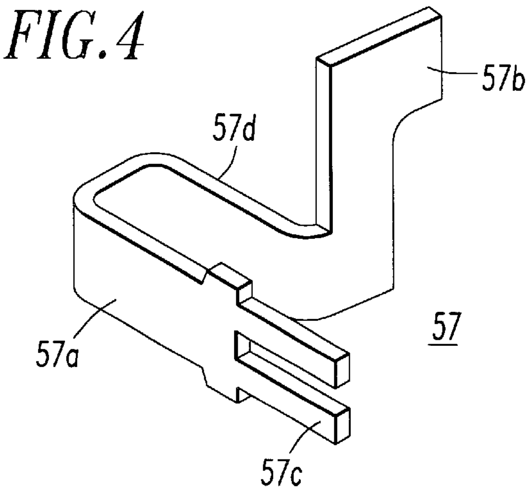
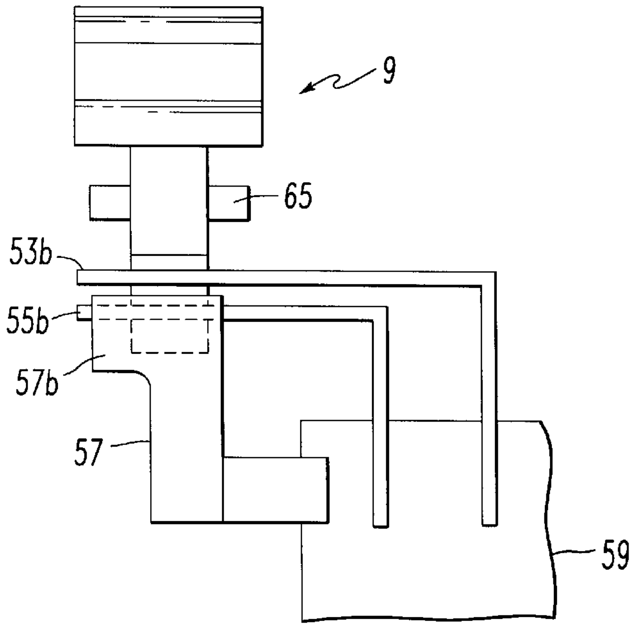
FIG. 5A
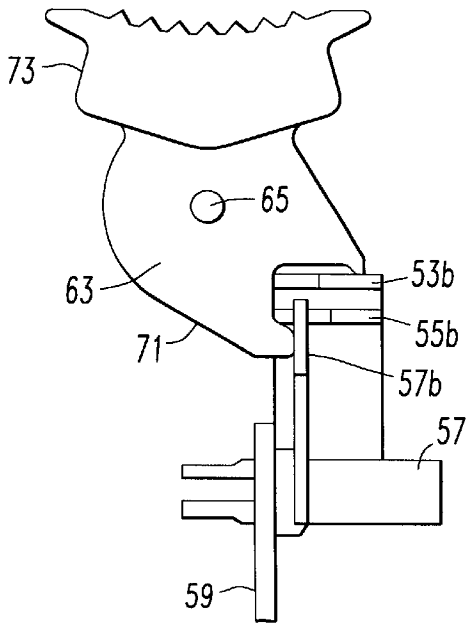
FIG. 5B

CIRCUIT BREAKER WITH COMMON TEST BUTTON FOR SEPARATE TESTING OF GROUND FAULT AND ACR FAULT FUNCTION

RELATED APPLICATION

Commonly owned, concurrently filed application entitled "CIRCUIT BREAKER WITH DUAL FUNCTION TEST BUTTON REMOTE FROM TEST CIRCUIT" and bearing attorney docket no. 98-PDC-541.

FIELD OF THE INVENTION

This invention relates to circuit breakers provided with both ground fault and arc fault trip circuits, and more particularly, to a common test button for actuating selectively a ground fault test circuit and an arc fault test circuit.

BACKGROUND INFORMATION

Circuit breakers provide overcurrent and short circuit protection for electric power systems. In the small circuit breakers, commonly referred to as miniature circuit breakers, used for residential and light commercial applications, such protection is typically provided by a thermal-magnetic trip device. Such a device includes a bimetal which is heated and bends in response to a persistent overcurrent condition thereby unlatching a spring powered operating mechanism which opens the separable contacts of the circuit breaker to interrupt current flow in the protected power system. An armature attracted by the sizable magnetic forces generated by a short circuit also unlatches, or trips, the operating mechanism.

In many applications, the miniature circuit breaker also provides ground fault protection. An electronic circuit detects leakage of current to ground and generates a ground fault trip signal. This signal energizes a shunt trip solenoid which unlatches the operating mechanism, typically through actuation of the thermal-magnetic trip device.

Recently, there has been considerable interest in also providing protection against arcing faults. Arcing faults are intermittent high impedance faults which can be caused for instance by worn insulation, loose connections, broken conductors, and the like. Because of their intermittent and high impedance nature, arcing faults do not generate currents of sufficient instantaneous magnitude or sufficient average current to trigger the thermal-magnetic trip device. Consequently, separate electrical circuits have been developed for responding to arcing faults.

Ground fault protection circuits and arc fault protection circuits typically include test circuits for affirming their continued operability. These tests must be performed independently to assure operation of both functions. The simplest approach is to provide separate test switches, each with its own test button, for performing the ground fault and arc fault tests. However, the molded cases of the miniature circuit breakers have been standardized for interchangeable use in load centers. There is limited space available in the standardized miniature circuit breakers for all of the additional circuitry required for ground fault and arc fault protection, let alone the test circuits.

Commonly owned U.S. patent application Ser. No. 069,355 filed on Apr. 29, 1998 discloses an arrangement in which a common test button selectively actuates either the ground fault test circuit or the arc fault test circuit. The arc fault test switch and ground fault test switch comprise cantilevered electrically conductive flat springs straddling but spaced from a common flat spring. The free ends of all three of these flat springs are in parallel planes. The common test button is a rocker button rotatable in one direction from a neutral position to deflect the flat spring of the arc fault test switch into contact with the common flat spring to actuate the arc fault test circuit. When the rocker button is rotated in the other direction from the neutral position, the flat spring of the ground fault test switch is rotated into engagement with the common flat spring. One or more leaf springs secured in slots in the rocker button bias it to the neutral position. While this common rocker button separately actuates the two test circuits, its reliability is dependent upon tight manufacturing tolerances. Also, the biasing springs add additional labor and cost to manufacture of the circuit breaker.

There is a need, therefore, for an improved arrangement for selectively actuating an arc fault test circuit and a ground fault test circuit in a circuit breaker, and especially in a miniature circuit breaker.

There is a further need for such a circuit breaker which is easy to use, is inexpensive to manufacture, and does not require the holding of tight manufacturing tolerances.

SUMMARY OF THE INVENTION

These needs and others are satisfied by the invention which is directed to a circuit breaker which incorporates an electronic trip circuit which includes two test circuits each having their own test switch, such as for instance, for testing a ground fault protection circuit and an arc fault protection circuit. These test switches include separate first and second test contacts and a common contact. These first and second test contacts comprise cantilevered electrically conductive elongated springs selectively deflectable in generally orthogonal planes into engagement with the common contact. The circuit breaker further includes a common actuator moveable to a first position to deflect only the first test contact into engagement with the common contact to actuate only the first test circuit, and moveable to a second position to deflect only the second test contact into engagement with the common contact to actuate only the second test switch. The common actuator has a neutral position in which neither switch is actuated.

Preferably, the first and second test switch contacts and the common contact are flat electrically conductive elongated cantilevered springs having free ends. The free ends of the first switch contact and the common contact extend in parallel planes while the free end of the second switch contact extends in a plane substantially perpendicular to these parallel planes. The free end of the first flat switch contact is deflectable into flat surface contact with the common contact. The free end of the second flat switch contact is deflectable with a flat surface thereof engaging an edge of the common contact. The common actuator is moveable in a first direction from the neutral position to a first position in which the first switch is actuated, and is moveable in a second direction opposite the first direction from the neutral position to a second position to actuate the second switch. In the preferred embodiment, the common actuator is a rocker button mounted for rotation about a pivot axis which is parallel to the planes of the free ends of all three of the contact springs.

When the electronic trip means is provided on a printed circuit board, the cantilevered flat springs have fixed ends which are fixed to the printed circuit board with all of the fixed ends extending in parallel planes. The second switch contact is then bent between the fixed end and the free end so that the free end is substantially perpendicular to the plane of the fixed end.

Preferably, the rocker button has fingers which engage the flat springs of the first switch contact and second switch contact and are spaced apart so that a preload is applied to the first and second switch contacts to bias the rocker button to the neutral position.

BRIEF DESCRIPTION OF THE DRAWINGS

A full understanding of the invention can be gained from the following description of the preferred embodiments when read in conjunction with the accompanying drawings in which:

FIG. 4 is an isometric view of a preferred form of the ground fault spring contact in accordance with the invention.

FIGS. 5*a* and 5*b* are side and end elevation views, respectively, of the rocker button and spring contacts shown in the neutral position.

DESCRIPTION OF THE PREFERRED EMBODIMENTS

The invention will be described as applied to a single pole miniature circuit breaker of the type commonly used in residential and light commercial applications. However, it will be evident to those skilled in the art that the invention is also applicable to other types of circuit breakers as well.

Figure 1:
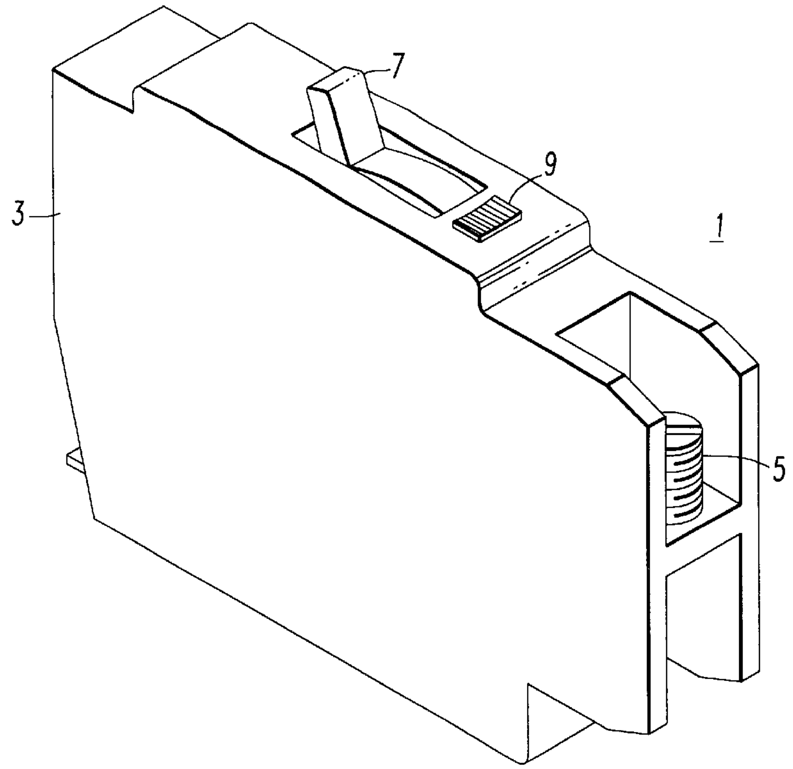
FIG. 1 is an isometric view of a circuit breaker incorporating the dual test button of the invention.

Referring to FIG. 1, the circuit breaker 1 includes a housing 3 which is assembled from a number of molded sections composed of an electrically insulating material, as is well known. Terminals 5 are provided at one end of the housing 3 for connecting the circuit breaker to a load. Line terminals (not shown) at the opposite end of the housing 3 connect the circuit breaker to a commercial power distribution system. A molded handle 7 projects from the housing for manually opening and closing the circuit breaker. A common test button 9 in accordance with the invention is also accessible through the housing.

Figure 2:
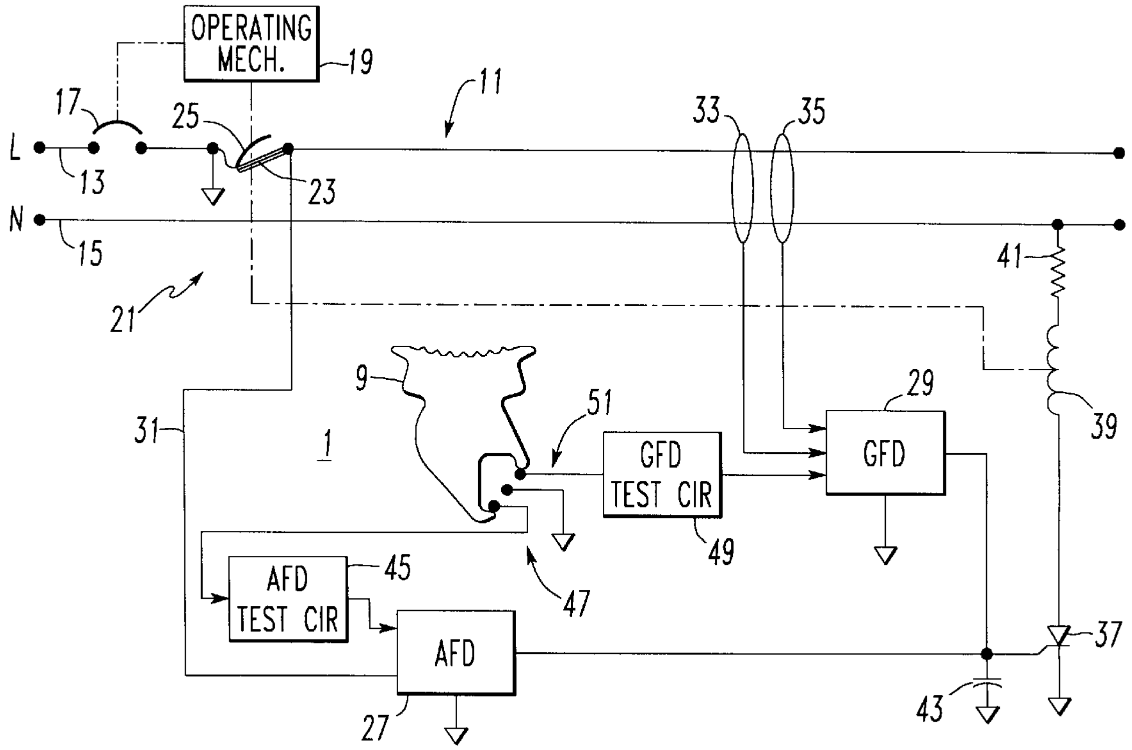
FIG. 2 is a schematic diagram of the circuit breaker of FIG. 1.

As shown in FIG. 2, the circuit breaker 1 is connected in an electric power system 11 which has a line conductor 13 and a neutral conductor 15. The circuit breaker includes separable contacts 17 which are connected in the line conductor 13. The separable contacts 17 are opened and closed by an operating mechanism 19. In addition to being operated manually by the handle 7, the operating mechanism can also be actuated to open the separable contacts 17 by a trip assembly 21. This trip assembly 21 includes the conventional bimetal 23 which, when heated by persistent overcurrents, bends to actuate the operating mechanism 19 to open the separable contacts 17. An armature 25 in the trip assembly 21 is attracted by the large magnetic force generated by very high overcurrents to also actuate the operating mechanism 19 and provide an instantaneous trip function.

The circuit breaker 1 is also provided with an arc fault detector (AFD) 27 and a ground fault detector (GFD) 29. The arc fault detector 27 may be, for instance, of the type which detects the step increases in current which occur each time an arc is struck, although other types of arc fault detectors could also be used. The arc fault detector senses the current in the electrical system 11 by monitoring the voltage across the bimetal 23 through the lead 31 in the manner described in U.S. Pat. No. 5,519,561. The ground fault detector 29 may be of the well known dormant oscillator type in which case it utilizes a pair of sensing coils 33 and 35 to detect both line to ground and neutral to ground faults. If the arc fault detector 27 detects an arcing fault in the electric power system 11, a trip signal is generated which turns on a switch such as the silicon controlled rectifier (SCR) 37 to energize a trip solenoid 39. Detection of a ground fault by the ground fault detector 29 generates a trip signal which also turns on the SCR 37 and energizes the trip solenoid 39. The trip solenoid 39 when energized actuates the operating mechanism 19 to open the separable contacts 17. A resistor 41 in series with the coil of the solenoid 39 limits the coil current and a capacitor 43 protects the gate of the SCR from voltage spikes and false tripping due to noise.

Both the arc fault detector 27 and the ground fault detector 29 have test circuits. The arc fault detector test circuit 45 provides signals to the arc fault detector 27 which mimic arc faults in the electrical system 11. The arc fault detector test circuit 45 is actuated by an arc fault test switch 47. The ground fault detector test circuit 49 when actuated by a ground fault test switch 51 generates a test signal which is applied to the ground fault detector 29. If the arc fault detector 27 and the ground fault detector 29 are operating properly, they should generate trip signals which open the separable contacts when the associated test circuit is actuated.

Figure 3:
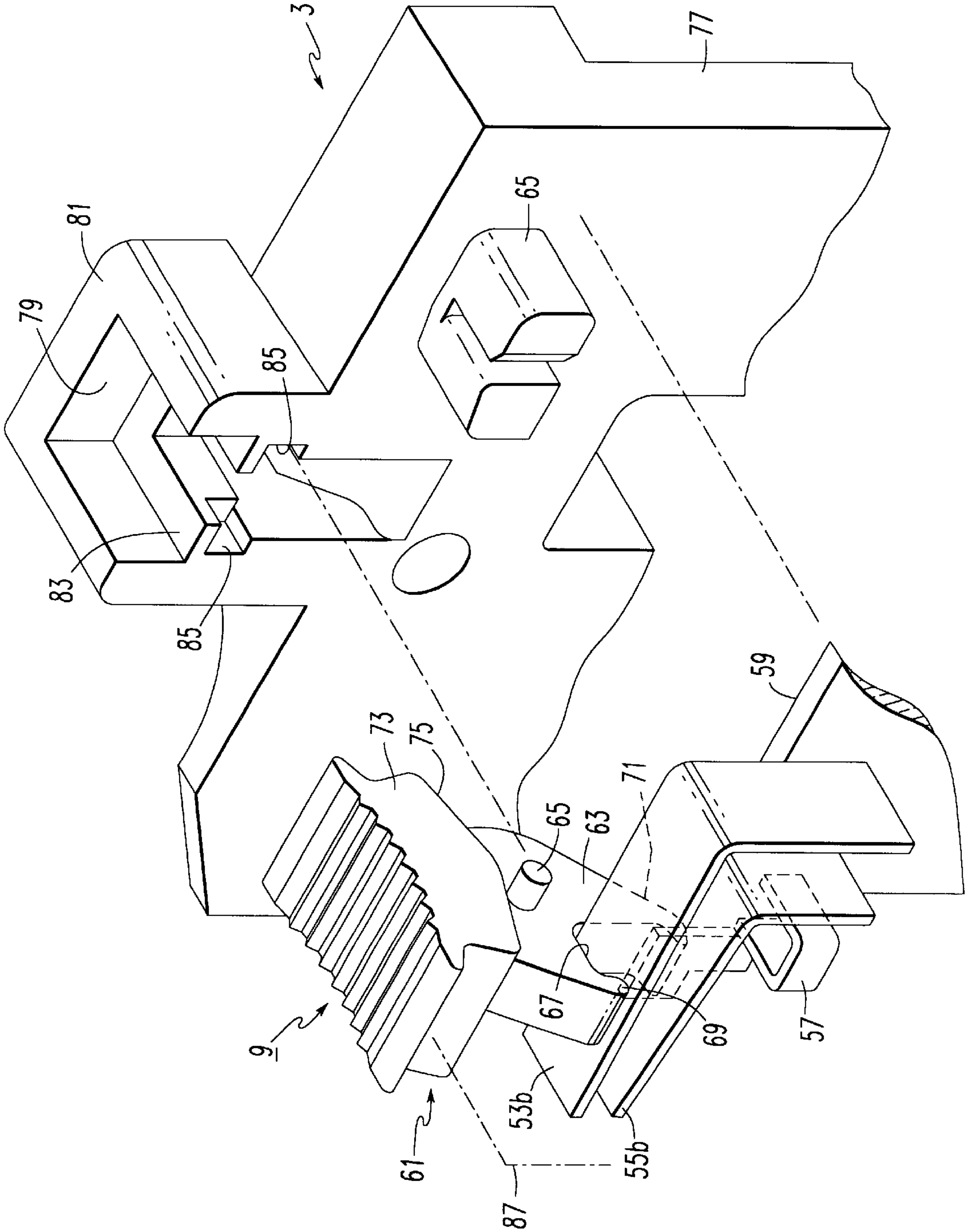
FIG. 3 is an exploded fragmentary isometric view of a section of the molded housing of the circuit breaker illustrating the mounting of the common test button.

The arc fault test circuit 45 and the ground fault test circuit 49 are actuated alternatively by the common test button 9. The physical arrangement of the test switches and the common test button are shown in the remaining figures. As shown in FIG. 3, the arc fault test switch 47 includes a hot, electrically conductive arc fault spring contact arm 53 and a circuit breaker common electrically conductive spring contact 55 forming a mating contact. The ground fault test switch 51 includes a hot, electrically conductive ground fault spring contact arm 57 and also utilizes the circuit breaker common spring contact 55 as the mating contact. The spring contacts 53, 55 and 57 are mounted on a printed circuit board 59 mounted within the housing 3. The contacts 53, 55 and 57 are cantilevered from the printed circuit board 59. The common spring contact 55 and the arc fault spring contact arm 53 have fixed ends 55*a* and 53*a* which are secured to the printed circuit board in parallel planes. These spring contacts 55 and 53 have a right angle bend so that their free ends 55*b* and 53*b* are in close parallel spaced relation.

The ground fault spring contact arm 57 has a fixed end 57*a* which is fixed to the printed circuit board 59 in spaced parallel in relation with the fixed ends 55*a* and 53*a*. However, the free end 57*b* is orthogonal to the free end 55*b* of the common spring contact and is laterally spaced from a side edge 55*c* of the free end 55*d* of the common spring contact. The preferred configuration of the ground fault spring contact 57 is shown in FIG. 4. The fixed end 57*a* has a pair of projections 57*c* which extend through the printed circuit board and are soldered on the far side to electrical traces (not shown) connecting the spring contact arm 57 to the ground fault test circuit. The flat ground fault spring contact is bent into a U-shape 57*d* adjacent the fixed end 57*a*. The free end 57*b* extends from the U-shaped section

57*d* at right angles to the fixed end 57*a*. The free end 57*b* can be widened to provide extended contact with the edge 55*c* of the common contact.

Referring to FIGS. 3, 5*a* and *b*, the common test button or switch 5 actuator 9 has a molded body 61 with a flat main section 63 from which an integral pivot pin 65 extends transversely from both sides. The main section 63 of the molded body 61 has a recess 67 which forms a first actuating finger 69 and a second orthogonally directed actuating finger 71. The molded body 61 of the common test button 9 has a head section 73 which is wider than the main section 63 forming on either side of the head section downwardly convex undercut rocker surfaces 75.

As shown in FIG. 3, a molded section 77 of the housing 3 has a recess 79 with an escutcheon 81 extending around the opening. A recessed shoulder 83 faces the opening. Under the shoulder 83 is a pair of facing notches 85. The common test button 9 is inserted in the mounting recess 79 with the pivot pin 65 seated in the notches 85. A complimentary arrangement of the mounting recess 79, escutcheon 81, shoulder 83 and notches 85 is provided in a facing molded section (not shown) of the housing 3, so that the dual test button 9 is captured with the undercut surfaces 75 seated on the shoulder 83 for rotation in a plane 87 transverse to the pivot pin 65.

As can best be seen from FIGS. 5*a* and 5*b*, with the circuit breaker assembled, the first actuating finger 69 on the common actuator 9 engages the top surface of the free end 53*b* of the arc fault spring contact while the second actuating finger 71 engages the side surface of the free end 57*b* of the ground fault spring contact. Neither the arc fault spring contact nor the ground fault spring contact are deflected sufficiently to contact the common spring contact 55, but the deflection of the arc fault spring contact and ground fault spring contact offset each other and bias the common actuator button 9 to a central neutral position.

Figure 6A:
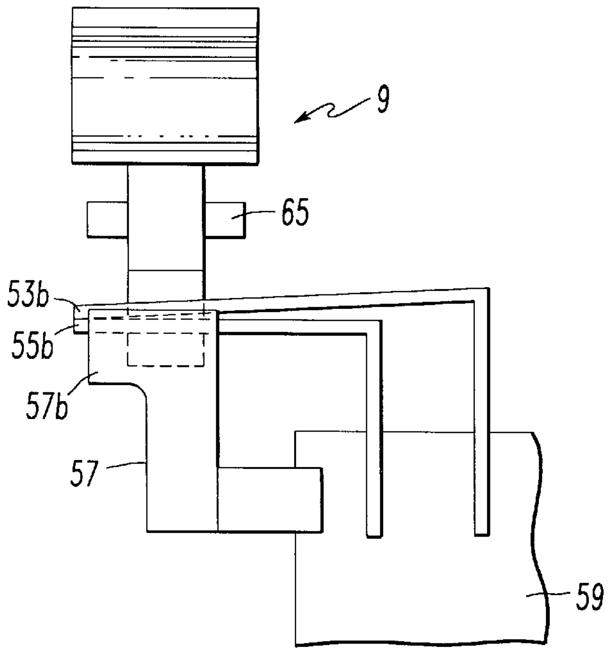
FIGS. 6*a* and 6*b* are similar to FIGS. 5*a* and 5*b* but showing the switch actuated to implement an arc fault test.
Figure 6B:
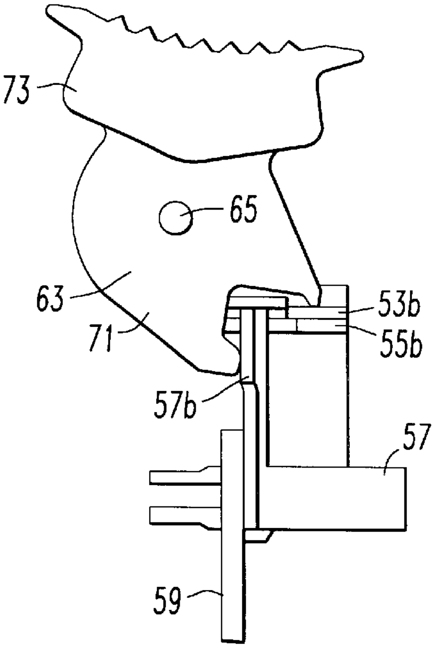
Figure 7A:
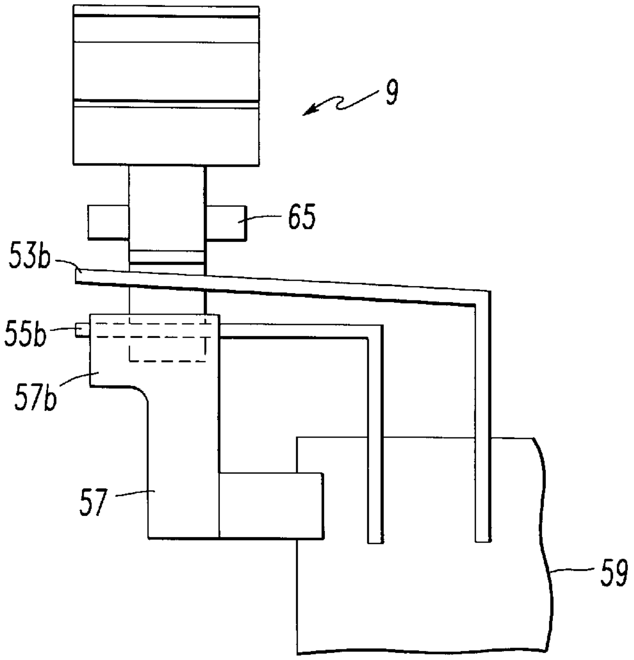
FIGS. 7*a* and 7*b* a side elevation view similar to FIG. 5*a* but showing the dual test button rotated to implement a ground fault test.
Figure 7B:
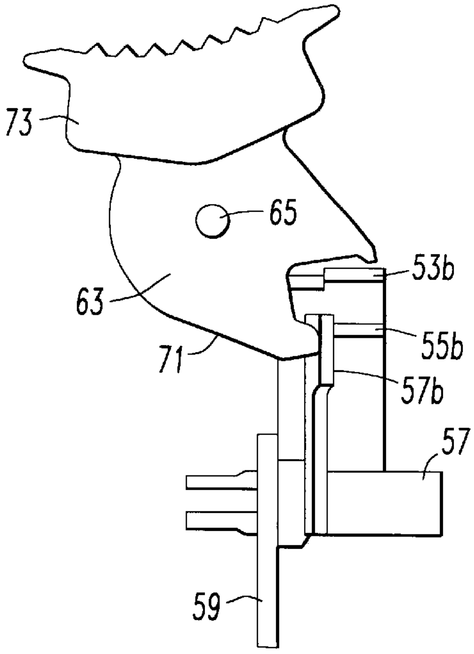

It would be noted that the head 73 of the dual test button 9 is slightly concave about an axis parallel to the pivot pin 65 and is transversely serrated to form a gripping surface 89. The dual test button 9 is actuated by a plane pressured to the gripping surface 89 to rotate the test button about the pivot pin 65. When the test button is rotated clockwise as viewed in FIG. 6*a* to a first actuated position, as also shown in FIG. 6*b*, the actuating finger 69 deflects the free end 57*b* of the arc fault spring contact 57 downward until it comes into contact with the common spring contact free end 55*b* and therefore closes the arc fault detector test switch 47 to initiate an arc fault test. The free ends 57*a* and 55*a* of the arc fault spring contact and the common spring contact being in parallel planes, the flat surfaces of these free ends make electrical contact to actuate the arc fault test circuit. When the dual test button 9 is released, the arc fault spring contact 57 rocks it back to the neutral position shown in FIGS. 5*a* and 5*b*. Rocking the dual test button 9 counterclockwise as shown in FIG. 7, causes the second actuating finger 71 to deflect the free end 53*b* of the ground fault spring contact into engagement with the common spring contact 55 thereby closing the ground fault test switch 51 and actuating the ground fault test circuit 49. As the free ends 57*a* and 55*a* of the ground fault spring contact and common spring contact are in orthogonal planes, the flat surface of the free end 57*a* of the ground fault spring contact makes electrical contact with the side edge 55*c* of the free end 55*b* of the common spring contact. Release of the dual test button 9 results in the relaxation of the ground fault spring contact which returns the rocker button to the neutral position and opens the ground fault test switch.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A circuit breaker comprising:

a housing;

separable contacts mounted in said housing;

an operating mechanism for opening said separable contacts when actuated;

trip means for actuating said operating mechanism in response to predetermined current conditions and including electronic trip means incorporating a first test circuit, a first test switch including a first switch contact, a second test circuit with a second test switch including a second switch contact, and a common contact, said first switch contact and said second switch contact comprising cantilevered electrically conductive springs selectively deflectable in generally orthogonal planes into engagement with said common contact; and a common actuator moveable to a first position to deflect only said first switch contact into engagement with said common contact to actuate only said first test switch, and moveable to a second position to deflect only said second switch contact into engagement with said common contact to actuate only said second test switch, and a neutral position in which neither test switch is actuated.

2. The circuit breaker of claim 1 wherein one of said first test circuit and second test circuit comprises a ground fault test circuit and the other of said first test circuit and said second test circuit comprises an arc fault test circuit.

3. The circuit breaker of claim 1 wherein each of said first switch contact, said second switch contact and said common contact are flat cantilevered electrically conductive elongated springs having free ends, said free ends of said first switch contact and said common contact extending in parallel planes and said free end of said second switch contact extending in a plane substantially perpendicular to said parallel planes, said free end of said first switch contact being deflectable into flat surface contact with said common contact and said free end of said second switch contact being deflectable with a flat surface thereof engaging an edge of said common contact.

4. The circuit breaker of claim 3 wherein said common actuator is supported by a mount for movement in a first direction from said neutral position to said first position and for movement in a second direction opposite to the first direction from the neutral position to said second position.

5. The circuit breaker of claim 4 wherein said common actuator comprises a rocker button and said mount comprises a pivot axis about which the rocker button is rotated in said first direction to said first position and is rotated in a second direction to said second position, said pivot axis being parallel to the planes of the free ends of said first switch contact, said second switch contact and said common contact.

6. The circuit breaker of claim 5 wherein said electronic trip means includes a printed circuit board and wherein said first switch contact, said second switch contact and said common contact all have fixed ends cantilevered from said printed circuit board in parallel planes, said second switch contact being bent such that said free end of said second switch contact is in a plane substantially perpendicular to the plane of the fixed end of said second switch contact.

7. The circuit breaker of claim 5 wherein said rocker button has a first finger deflecting said free end of said first switch contact into contact with said common contact when said rocker button is rotated to said first position, and a second finger deflecting said free end of said second switch contact into contact with said common contact when said rocker button is rotated to said second position.

8. The circuit breaker of claim 7 wherein said fingers on said rocker button are spaced so that both the first switch contact and second switch contact are deflected but are not in contact with said common contact with said rocker button in said neutral position to bias the rocker button to said neutral position.

9. The circuit breaker of claim 8 wherein one of said first test circuit and second test circuit is a ground fault test circuit, and the other of said first test circuit and second test circuit is an arc fault test circuit.

10. The circuit breaker of claim 1 wherein said common actuator comprises a rocker button rotatable from said neutral position to said first position and to said second position.

* * * * *